Sept. 21, 1965 J. E. APPLEQUIST ETAL 3,208,057

FORMAT CONTROL FOR DISK RECORDING

Filed Dec. 26, 1961 2 Sheets-Sheet 1

INVENTORS.
JAMES E. APPLEQUIST
WILLIAM G. DYE

BY Walter J. Madden Jr.
ATTORNEY

Sept. 21, 1965 J. E. APPLEQUIST ETAL 3,208,057

FORMAT CONTROL FOR DISK RECORDING

Filed Dec. 26, 1961 2 Sheets-Sheet 2

United States Patent Office 3,208,057
Patented Sept. 21, 1965

3,208,057

FORMAT CONTROL FOR DISK RECORDING

James E. Applequist, Los Angeles, and William G. Dye, San Jose, Calif., assignors to International Business Machines Corporation, New York, N.Y., a corporation of New York Filed Dec. 26, 1961, Ser. No. 161,814
12 Claims. (Cl. 340—174.1)

Figure 1:
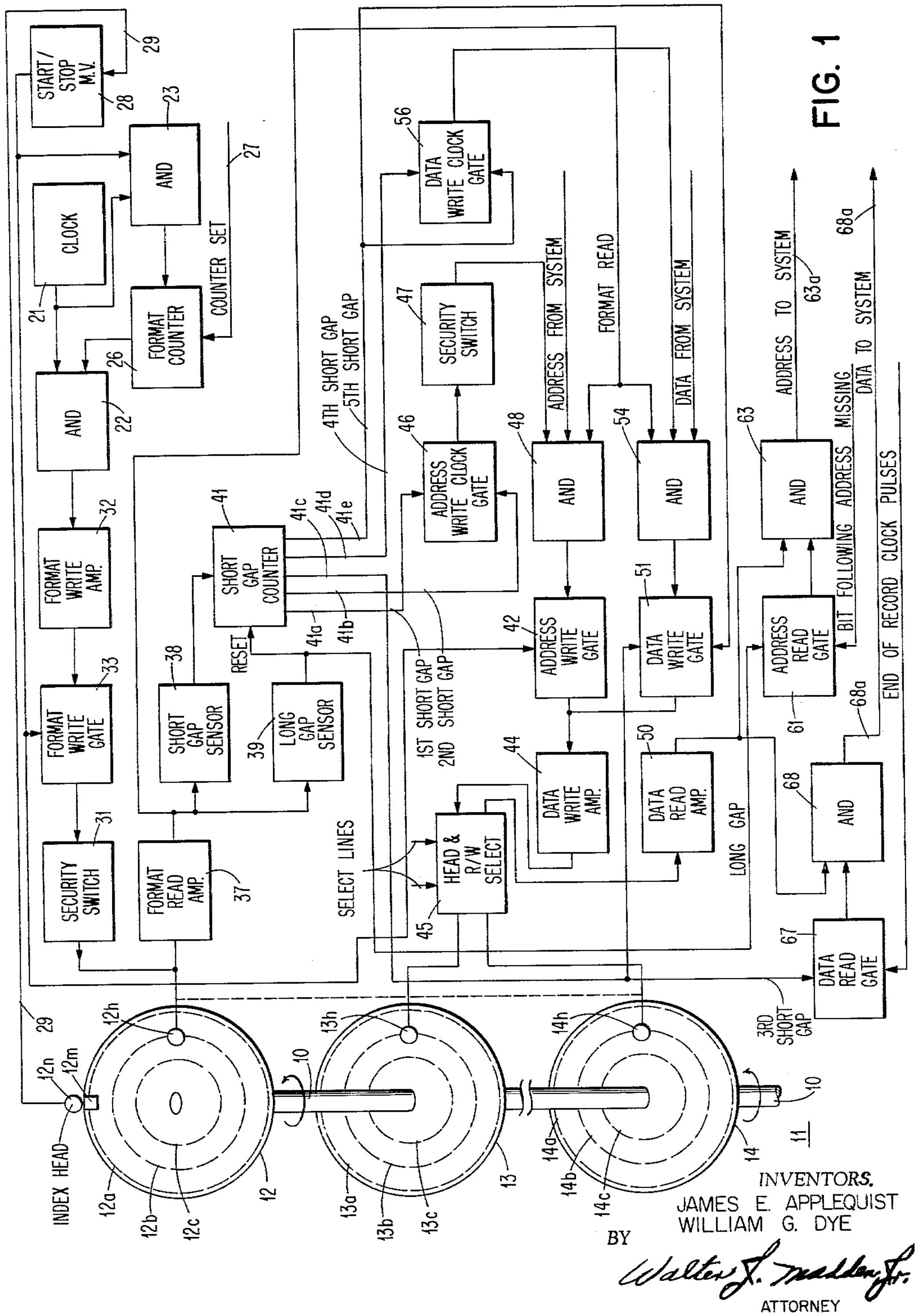

This invention relates in general to data storage devices and relates more particularly to controlling the flow of data to and from such storage devices.

In the field of data processing, there is extensive use of random access storage files which are in the form of a plurality of recording disks mounted for rotation on a common spindle. Both surfaces of each of these disks are generally provided with a magnetizable recording medium with which one or more transducers cooperate to record data and to reproduce this data on demand. In such random access files the recording surface of each disk is generally divided into a plurality of concentric recording tracks proceeding radially from the center of the disk. Each of such tracks in turn is usually broken down into a plurality of records. One common form of disk file is provided with fifty disks, with 200 tracks per disk surface, and each track is divided into five records of equal length around the track. The start and stop points of each record are controlled by so-called sector heads or transducers which are fixed relative to the rotating disks and which sense one or more sector marks provided on one of the disks to provide start and stop pulses for each of the five records on every track. The use of such sector heads for determining record length is satisfactory under some circumstances, but it does have the disadvantage that it results in records of fixed length on all tracks of all disks in the file. While it may be desirable, or even necessary, in some applications to provide records of fixed length, there are many applications where it is a distinct advantage to have records of different lengths available in different portions of the disk file, particularly where there are a large number of data surfaces provided in the file and a variety of different types of data to be recorded thereon.

Broadly, the present invention contemplates, in a disk file having a plurality of different record surfaces thereon, the use of a format arrangement which results in records of different lengths on the same or different disk surfaces. In accordance with the present invention, a disk file is provided with one recording surface called a format surface on which is recorded a format track arrangement which controls the record lengths on the data disk surfaces. In one embodiment of the invention for use with a disk file having a plurality of disks mounted on a common vertical spindle the format disk is the uppermost disk in the file and is provided with as many concentric format tracks as there are data tracks on each of the underlying data disks. Each format track on the format disk is thus associated with a "cylinder" of underlying data tracks on the different data disks, and each such format track thus controls the arrangement of data records on all of the underlying data tracks within this cylinder. In the preferred embodiment of the invention, each data surface of the disks is provided with its own transducer which magnetically cooperates therewith for recording and reproducing data. All of these transducers are movable as a unit radially of their associated disks to cooperate with different ones of the data tracks. There is also provided a format transducer which moves with the data transducers for reading from the appropriate format track at any one of the different radial track positions.

Each format track comprises an arrangement of magnetic bits separated by gaps, and it is this combination of magnetic bits and gaps therebetween which is sensed by the format transducer to control the reading or writing operations on the associated cylinder of data tracks. The particular configuration of the different format tracks will depend upon the desired organization of the data records. In addition to controlling the length of the data records, the format tracks may be utilized to control other functions. Where each data record on the data surfaces is preceded by an address which identifies the subsequent record, the format track for each such record may include a portion for controlling this address portion. Similarly, the format track may include an automatic gain control portion where the data surfaces include a portion for AGC pulses to control the gain of the reading amplifier on a readback operation.

In one embodiment of the invention, the format track for each record controls only the lengths of the different portions of the record on the data disks, such as address, AGC and data, while the timing or clocking of the data is controlled by other means. However, in another embodiment of the invention, the format track controls the lengths of the address, AGC and data portions, and also provides clocking pulses for clocking the writing of data on the underlying data tracks.

An additional feature of the present invention involves the use of an address portion in each record preceding each data portion and identifying this data portion. Heretofore, in commercially available disk files, the different records on the file were identified by their position relative to the different sector heads discussed above. A record address was specified by specifying the disk sector in which the record was located. To locate a given record, sector pulses were counted, starting from the home position, until the indicated sector was reached, at which time a read or write operation would commence. This technique is subject to the disadvantage that errors in the sector pulse counting circuitry may result in read or write operations taking place on other than the desired record. Further, even if some type of an address is provided on each record immediately preceding the data portion of this record, the fixed record length system is still subject to the disadvantage that it necessitates reading the address portion on one disk revolution and then waiting a complete disk revolution for the data portion of that record to come back under the transducer for performing the read or write operation on the data portion.

In accordance with the present invention, the address portion preceding the data portion of every record permits verification of the address of the immediately following data and still permits a read or write operation to commence immediately on the data if the address of that data matches the desired address. The address portion of the record in accordance with the present invention may comprise any suitable combination of magnetic bits which will uniquely identify the following data portion. The address portion may be written on the data track at the same time that the data portion itself is written. When a record locating operation is to take place, the addresses are read sequentially from the specified data track under the control of gaps sensed in the address portion of the associated format track as these tracks rotate under their associated transducers. Each address read is compared with the desired address until an "address compare equal" is received, indicating that the following data is the data sought and that the desired read or write operation on the data portion of this record may then take place. In the normal operation of the file, the address portion is not subject to erasure or rewriting, in order to preserve the correctness of the address and prevent loss of the data which that address identifies.

For maximum security in protecting the record address and the data it identifies, an "indelible" address technique may be employed. In this technique, the addresses are written in the appropriate address portions of the different data tracks at the time of organizing the data on the file. After once writing these addresses, suitable security means are utilized to prevent further writing on these address portions, thus preventing inadvertent erasure or modification of the addresses. It will be understood that the writing of these addresses on the file is under the control of the format tracks in the manner described above.

The foregoing and other objects, features and advantages of the invention will be apparent from the following more particular description of a preferred embodiment of the invention, as illustrated in the accompanying drawings.

Figure 2:
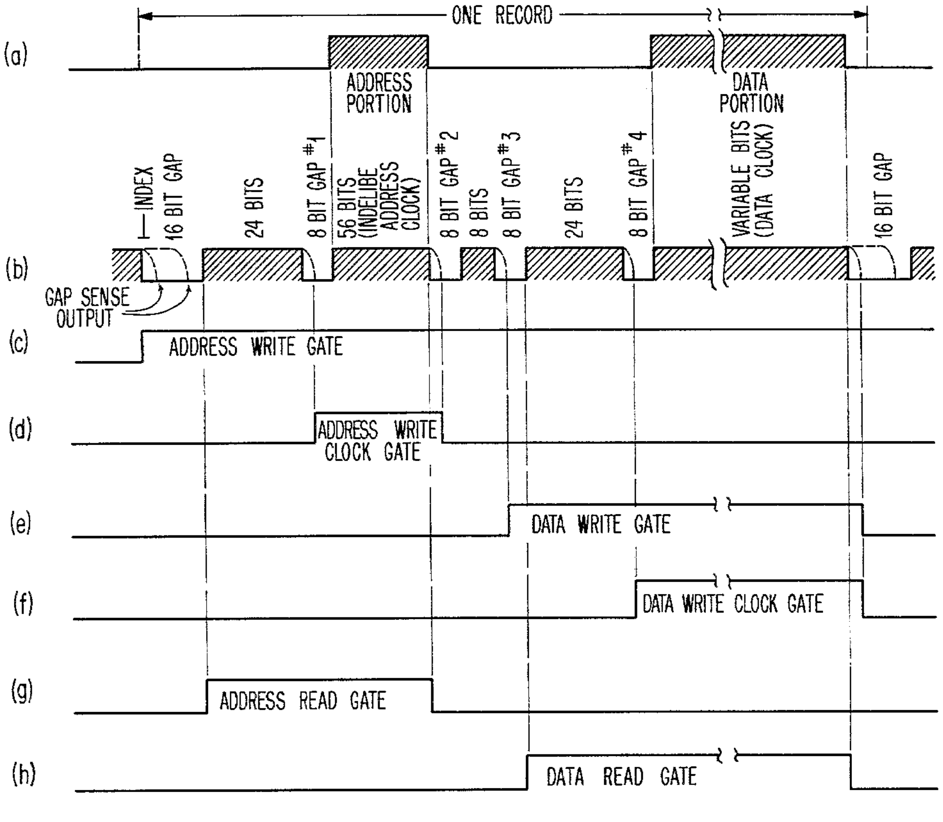

In the drawings:

FIG. 1 is a schematic drawing illustrating one embodiment of the present invention in which the format tracks control the timing of writing data on the data tracks as well as controlling the lengths of the address, AGC and data portions of the records; and FIG. 2 is a series of timing diagrams illustrating the relationships among the different circuit elements of the embodiment of FIG. 1.

Referring to FIG. 1 by character of reference, one embodiment of the invention is illustrated in connection with a disk file 11 comprising a plurality of disks 12, 13, 14 . . . . All of the disks are mounted for rotation on a common spindle 10 which is driven by suitable motive power means (not shown) for rotating all of the spaced disks at a suitable speed. Each of the disks is preferably provided with a magnetizable recording material on both of its surfaces, and each such recording surface is divided into a plurality of concentric recording tracks such as tracks 12*a*, 12*b*, 12*c*, 13*a*, 13*b*, 13*c*, 14*a*, 14*b*, 14*c*. Each disk surface is preferaby provided with an individual transducer which magnetically cooperates therewith for recording on the surface and reproducing the recorded information. Such transducers may be in the form of read-write heads 12*h*, 13*h*, 14*h* for the different disk surfaces illustrated.

All of the read-write transducers are preferably mounted for common movement radially of their associated disk surfaces, as indicated by the dotted line representing a mechanical connection. Such movement may be provided by any suitable means, such as the positioning mechanism disclosed in the copending application, Serial No. 55,994 of Marshall E. Freeman, assigned to the same assignee as the present application. The read-write transducers are thus positionable to any one of a plurality of discrete track positions for cooperating with the magnetic track immediately adjacent thereto. In this connection, although only three disks have been illustrated, it will be understood that a commercial disk file embodying the invention may involve a large number of such disks. Similarly, although only a few tracks per disk are illustrated, it will be understood that a large number, such as 250, of these concentric tracks may be provided on each disk surface, and that the associated transducers will be positionable to any one of these different tracks.

In the illustrated embodiment, it is assumed that disk surface 12 is the format disk surface for controlling the arrangement of records on the underlying data disk surfaces 13, 14, etc. The different tracks 12*a*, 12*b*, 12*c*, etc. on the format disk surface 12 will be thus laid out in accordance with the record format desired on the underlying tracks on the data disks, and this format arrangement on the format disk will control the start, length and stop of the records on the underlying data disks. Before describing the manner in which the format tracks are produced on the format disk surface 12 and how these format tracks control the records on the underlying data disks, consider the arrangement of a typical data track and a typical format track as shown in the graphs of FIG. 2. FIG. 2*a* illustrates one representative record on a data track; such a record includes a data portion which comprises any desired number of characters. It will be understood that each such character in the data portion will be made up of different combinations of binary bits in the particular binary code being utilized. The data portion of the record will be preceded by an address portion which is a combination of characters which identify the subsequent data in that record. In connection with the embodiment of FIG. 1, it is assumed that "indelible" addresses are used. As discussed above, the term "indelible" indicates that the address, once written on the record, is not subject to change or alteration during normal operation of the storage medium and may be changed only by special means to be described below.

FIG. 2*b* illustrates a portion of a format track for controlling the production of a record track as shown in FIG. 2*a*. The format track in FIG. 2*b* may be considered to begin with an index mark 12*m*. As is well known in the art, index mark 12*m* may be a magnetic mark which is scribed or otherwise produced at a predetermined point on one of the disk surfaces and is sensed by an index read head 12*n* to provide a pulse from this head once per revolution of the disk file.

Starting from the index mark there first occurs on the representative format track illustrated in FIG. 2*b* a gap of predetermined length during which no magnetic bits occur. In the illustrated embodiment, it is assumed that this gap has a length corresponding to 16 bits. Following the 16-bit gap, there occurs a portion of magnetic bits having a length in the illustrated embodiment of 24 bits. The 24-bit portion is followed by a first 8-bit gap and then by a magnetic bit portion having a length of 56 bits and corresponding to the "indelible" address portion of the format track. Following the "indilible" address portion of the format track, there occurs a second 8-bit gap, followed in turn by an 8-bit portion and then a third 8-bit gap. Following the third 8-bit gap there is a bit portion having a length of 24 bits and this is followed by a fourth 8-bit gap. Following the fourth 8-bit gap, there occurs a bit portion corresponding in length to the data portion of the record. The length of this data portion of the format track will, of course, be determined by the desired length of the data portion on the particular data tracks involved. Following the end of the data portion of the format track, there occurs another gap having a length corresponding to 16 bits which represents the start of the next record format on that track.

The various gap and bit portions of the illustrated format track are sensed and utilized to control the data reading and writing operations on the cylinder of underlying data tracks associated with that format track. That is, a given format track controls the lengths and start-stop points of all the records on the data tracks in the cylinder of data tracks underlying that format track. It will be understood that each format track may include more than one record, and that the number of records on each format track controls the number of data records on the underlying data disks.

Before considering how the format tracks control the data tracks, the method of placing the format tracks on format disk 12 will be described. A basic timing source or clock 21 is provided for emitting pulses having a frequency at least equal to the bit frequency to be utilized on the file. The clock pulses from source 21 are supplied in parallel to an AND gate 22 and an AND gate 23. AND gate 22 receives another input from a format counter device 26 which has been set according to the desired arrangement of the format track through a conductor 27. After setting of format counter 26, the counter is started by a pulse received from the output of AND gate 23 when that AND gate is open. In addition to the clock pulses, AND gate 23 receives an input from a start/stop multivibrator 28 which is controlled by pulses received from the index read head 12*n* over a conductor 29.

FORMAT WRITE

Thus, assuming that clock 21 is running, that format counter 26 has been preset in accordance with the desired format, and that it is desired to write on one of the tracks of format disk 12 that portion of the format track illustrated in FIG. 2*b*, the operation is as follows:

Format transducer 12*h* is first positioned over the appropriate format track. When the index mark 12*m* arrives under index read head 12*n*, the resultant pulse over conductor 29 flips multivibrator 28 to the "on" condition to supply an input pulse to gate 23. This opens gate 23 to supply pulses to counter 26 to clock out the format setting from this counter to AND gate 22. Since gate 22 receives as one input the clock pulses from clock 21, the format pulses from counter 26 are clocked through gate 22 in synchronism with the clock pulses.

The format pulses from counter 26 pass through a format write amplifier 32 and a format write gate 22 to a suitable security device, such as security switch 31. The function of security switch 31 is to prevent any inadvertent operation of format write amplifier 32 which would change or destroy the format tracks once they have been written. The output pulses from security device 31 are supplied to format head 12*h* where they serve to produce magnetization of the underlying format track in accordance with the predetermined format pattern. For the format track illustrated in FIG. 2*b*, the writing of the format track would begin by producing a gap 16 bits long, then a magnetic portion of 24 bits, followed by a gap of 8 bits, etc. Format write gate 33 is opened by a pulse received from start/stop multivibrator 28 when index mark 12*m* first passes head 12*n* after the start of a "format write" operation, and is closed by the pulse received from device 28 when index mark 12*m* makes its second passage under head 12*n*.

After the writing of the first format track, format transducer 12*h* is moved to the next track position for writing the format for that track. The operation thus proceeds to write each of the formats on each of the format tracks of format disk 12 in accordance with the predetermined format arrangement. It will be understood that during the writing of the format tracks, the data transducers 13*h*, 14*h*, which in the illustrated embodiment move with format transducer 12*h*, will not be operating. After completion of the writing of all the format tracks on format disk 12, the next step in the operation of the file is to write the "indelible" address portions on the data disks.

ADDRESS WRITE

To illustrate the method of writing the "indelible" addresses on the data tracks, assume that an indelible address portion as shown in FIG. 2*a* and corresponding to the address portion of the format track 12*a* is to be written on each of the data tracks 13*a*, 14*a*. Under these conditions, format transducer 12*h* is positioned over format track 12*a* and data transducers 13*h*, 14*h* are positioned over tracks 13*a*, 14*a* respectively. As transducer 12*h* reads the underlying format, its output is supplied through a format read amplifier 37 in parallel to the inputs of a pair of gap sensing devices 38, 39. Sensor 38 is called a short gap sensor and is operative to sense gaps having lengths of 3 bits or more, while sensor 39 is termed a long gap sensor and is operative to sense a gap of 12 bits or more. Since the double gap at the beginning of the format illustrated in FIG. 2*b* represents an absence of 16 bits, both short and long gap sensors 38 and 39 will sense this gap, but only short gap sensor 38 will sense the subsequent 8-bit gaps on the format.

The output pulses from short gap sensor 38 are supplied to a short gap counter 41 which counts the short gap pulses received from sensor 38 and supplies output pulses over different lines 41*a*, 41*b*, 41*c*, 41*d*, 41*e*, representing the number of short gaps sensed. The output of long gap sensor 38 is supplied as a reset pulse to short gap counter 41 to reset this counter when a long gap pulse is generated by long gap sensor 39.

At the start of an operation to write the indelible addresses on the different data disks, an address write gate network 42 is conditioned through multivibrator 28 by the first index pulse received from index read head 12*n* to open the address write gate, as shown in FIG. 2*c*. Address write gate 42 is thus opened by the first index pulse appearing at the start of an "address write" operation and is closed by the next appearance of this index pulse indicating one full revolution of the disk file. With address write gate 42 opened by the first index pulse, an amplifier 44 associated with transducer 13*h* is conditioned for subsequent address pulses to be received. In the embodiment illustrated in FIG. 1, it is assumed that all of the data heads 13*h*, 14*h*, etc. utilize a single write amplifier 44 whose output is supplied through a head selection network 45 for controlling the flow of write current to any selected one of the different data transducers. Similarly, it is assumed that a single read amplifier 50 is utilized and that network 45 controls the flow of read current from any selected one of the data transducers to read amplifier 50. Under these conditions, write amplifier 44 writes indelible addresses on the different data tracks, one track at a time, with the selection of the proper data transducer being made by head selection circuitry 45.

As the format of FIG. 2*b* proceeds under the format read head 12*h*, the first 8-bit gap in the format following the resetting of short gap counter 41 by long gap sensor 39 is sensed to produce an output pulse on output line 41*a* of short gap counter 41. This first short gap pulse is supplied over conductor 41*a* to the input of an address write clock gate 46. Receipt of this first short gap pulse by gate 46 opens this gate, as shown in FIG. 2*d*, to supply a pulse through a security device 47 to one input of an AND circuit 48 whose output is supplied through address write gate 42 to write amplifier 44. AND gate 48 also receives an input from the system source of address pulses representing the particular indelible address to be written on the data disk. AND gate 48 also receives an input from format read amplifier 37 associated with format transducer 12*h*. With address write clock gate 46 open, the pulses representing the indelible address to be written are clocked through AND gate 48 by the format pulses supplied through transducer 12*h* and read amplifier 37 to AND gate 48. That is, the 56 bits or pulses on the indelible address portion of format track 12*a* are supplied through read amplifier 37 to act as clock pulses in AND gate 48 for gating through the address bits forming the indelible address. Thus, the indelible address on the data disk is written in exact conformance with the duration and position of the 56 indelible address clock pulses on format track 12*a*.

After thus writing the indelible address for data track 13*a*, the operation may then proceed to similarly write the indelible addresses for the other data tracks 14*a*, etc. in this same cylinder of data tracks underlying format track 12*a*. In performing this operation, head selection circuitry 45 will select the appropriate data head for writing while the transducers are all positioned in this particular cylinder of tracks. After writing all of the indelible addresses for all of the data tracks within this cylinder, the transducer positioning mechanism will be activated to move the transducers to a new position corresponding to another cylinder of tracks, and the indelible address writing operation will proceed in a similar manner to write indelible addresses for these data tracks.

DATA WRITE

After completion of the writing of all of the indelible addresses on all of the data tracks, the file is ready to receive data in the different data portions of the data tracks. The data writing is controlled in part by a data write gate 51 which is opened by the third short gap pulse from counter 41 and closed by the fifth short gap pulse from counter 41 just before counter 41 is reset by the long gap pulse from long gap sensor 39 (FIG. 2*e*). Data write gate 51, when opened, conditions write amplifier 44 for writing the data pulses to follow. The data pulses to be recorded are supplied as one input to an AND gate 54 which receives another input from a data write clock gate 56. Data write gate 56 is opened by the fourth short gap pulse received over conductor 41*d* from short gap counter 41 and is closed by the fifth short gap pulse received over conductor 41*e*, as shown in FIG. 2*f*. AND gate 54 also receives an input from the format read transducer 12*h* and format read amplifier 37.

When data write clock gate 56 opens, this opens AND gate 54 so that the pulses read from the data portion of the format track are supplied through format transducer 12*h* and format read amplifier 37 to serve as clock pulses for clocking the data pulses through AND gate 54 and data write gate 51 to write amplifier 44 and the associated transducer. The data bits to be recorded are thus clocked into the appropriate data track by clock pulses from the data portion of format track 12*a*, so that the bits forming the data are written on the data tracks in exact conformance with the timing of the data clock pulses on the format track.

ADDRESS READ

In the embodiment illustrated in FIG. 1, the format tracks are also utilized to generate two read gates which gate the read amplifier for reading from the data tracks. The first of these gates is termed the address read gate 61 and is utilized to control the reading of the indelible addresses from the different data tracks. Address read gate 61 is opened by the pulse from long gap sensor 39 at the start of the format track, as illustrated in FIG. 2*g*. Opening of address read gate 61 supplies a pulse to an AND gate 63 which receives another input from read amplifier 50 associated with the selected data transducer. Thus, when address read gate 61 opens, its output pulse opens AND gate 63 to pass the read signal from the selected data head and data read amplifier 50. During this time, the selected data head will be reading the indelible address on the appropriate data track. This indelible address which is read by the data transducer is supplied through read amplifier 50 and AND gate 63 to an address output line 63*a*. This indelible address is supplied to any suitable known address compare network in which the bits corresponding to the indelible address are compared with a bit pattern representing the desired address, and when a "compare equal" is obtained, the desired reading or writing operation on the following data portion of the record may commence. Address read gate 61 remains open for the duration of the indelible address portion and is closed at the end of the indelible address portion of the format track by circuits which sense that the bit following the end of the indelible address pulses is missing. This is shown in FIG. 2*g*, where the address read gate opens in response to sensing the long gap at the start of the format and is closed at the end of the indelible address portion of the format track.

DATA READ

The format track also controls a data read gate 67 to activate the reading circuits during the data portion of the record. Data read gate 67 is opened by a pulse generated by counter 41 on line 41*c* at the time of the third short gap, as shown in FIG. 2*h*. When data read gate 67 opens, it supplies an input to an AND gate 68 which receives another input from read amplifier 50. Thus, when data read gate 67 is open, the read data from the selected data transducer is supplied through read amplifier 50 and AND gate 68 to the data output line 68*a*. Data output line 68*a* supplies the raw read data to the using system where it is clocked and decoded in accordance with well known techniques. The closing of data read gate 67 is controlled by sensing the end of the record clock pulses on the format track, as shown in FIG. 2*h*.

SUMMARY

To summarize the operation of the illustrated embodiment, the format tracks are first written in all positions on format disk 12 under the control of the clock 21 and the established formats to be recorded as determined by the settings of format counter 26. After writing the format tracks on format disk 12, the indelible address portions of the format tracks are utilized to control the writing of the indelible address portions of all of the data tracks. All of the data tracks in a given cylinder under any one format track will have the same format arrangement as to indelible address length and data portion length. However, different formats may be utilized on different format tracks, so that at least as many different record lengths may be obtained as there are format tracks available. Further, each format track may be broken down into one or more different records, each of which may have a format arrangement different from the other record formats on that format track.

After writing the indelible address portions on the tracks of the data disks, the disk file is ready for use for recording and reproducing information therefrom. As indicated above, the present invention is preferably utilized in connection with a disk file which provides one transducer for each data surface on the file, and all of these transducers, together with the format transducer 12*h*, are movable as a unit to any one of the different radial positions representing the different tracks on the disks. In this type of operation, a representative recording and reproducing operation would proceed as follows: The data and format transducers are driven to the appropriate track position under control of signals representing the desired track location. After the transducers have reached the desired position, the file then starts an address reading operation to locate the desired record within the selected track. Such location is performed by reading the address of each record on the selected track as it passes by the associated data head and comparing the addresses so read with the desired address until an "address compare" signal is obtained, indicating that the data location immeditaely following that address corresponds to the desired data location. The reading of the indelible addresses in the above manner is controlled by the format track through address read gate 61 which activates the read circuitry at the start of the format to permit the address bits to be read out through read amplifier 50 and gate 63 to the address clocking and compare circuitry.

After an "address compare" signal is obtained, indicating that the record underlying the selected data transducer at that instant is the desired record, either a writing or reading operation may be performed on the data portion of the selected record. A writing operation is initiated by opening of data write gate 51 at the third short gap and opening of data write clock gate 56 at the fourth short gap to permit the pulses recorded on the data portion of the format track to be read out and supplied to gate 48 to serve as clocking pulses for the incoming data from the system. These clock pulses from the format track thus gate the data to be recorded through AND gate 54 and data write gate 51 to write amplifier 44 and the selected data transducer. The write operation is terminated at the end of the data portion when data write clock gate 56 is closed by sensing of the fifth short gap in the format track.

Where a reading operation is to follow the "address compare" equal, data read gate 67 is opened by receipt of the third short gap pulse so that the data from the selected data transducer may be supplied through data read amplifier 50 and gate 68 to the clocking and using system. The data read operation is terminated by closing of data read gate 67 when the "end of record clock pulse" signal is received.

In the above description of the embodiment of FIG. 1, the format tracks were utilized both to control the start and stop points of the different portions of the record and to supply clock pulses for gating the writing of data on the data portions, while other clocking means were utilized to clock the reading of data from the file. If it is desired to control both the reading and writing of data by clock means other than the clock pulses obtained from the format track, this may be easily done while still utilizing the format tracks to control the start and stop points of the different portions of the records.

While the invention has been particularly shown and described with reference to a preferred embodiment thereof, it will be understood by those skilled in the art that various changes in the form and details may be made therein without departing from the spirit and scope of the invention.

What is claimed is:

1. Apparatus for controlling the flow of data to and from a rotating disk file having a plurality of magnetizable disks, each of said disks having at least one magnetizable surface for magnetic recording in a plurality of concentric tracks, comprising a format transducer and a plurality of data transducers for cooperating with said magnetizable surfaces, said transducers being adapted to move as a unit to different positions to cooperate with different ones of said concentric tracks, those tracks associated with any given position of said transducers defining a cylinder of tracks, a format surface on one of said disks, said format surface having thereon a plurality of format tracks each said format track comprising one said concentric track, each said format track on said format surface comprising a pattern of a plurality of magnetic bits with gaps therebetween for establishing the number and the length of records in all tracks within that cylinder of tracks including said-recited format track, means for sensing said gaps on said format surface tracks by said format transducer associated with said format surface, and means for controlling the flow of data to the tracks in any given cylinder of tracks in response to the arrangement of said gaps on the format track associated with said given cylinder, whereby a plurality of records having discrete lengths may be stored in said given cylinder.

2. Apparatus for controlling the flow of data to and from a rotating disk file having a plurality of magnetizable disks, each of said disks having at least one magnetizable surface for magnetic recording in a plurality of concentric tracks, comprising a format transducer and a plurality of data transducers for cooperating with said magnetizable surfaces, said transducers being adapted to move as a unit to different positions to cooperate with different ones of said concentric tracks, those tracks associated with any given position of said transducers defining a cylinder of tracks, a format surface on one of said disks, said format surface having thereon a plurality of format tracks each said format track comprising one said concentric track, each said format track on said format surface comprising a pattern of a plurality of magnetic bits with gaps therebetween for establishing the number and length of records in all tracks within that cylinder of tracks including said last-receited format track, means for sensing said gaps on said format tracks by said format transducer associated with said format surface, and means for controlling the flow of data from the tracks in any given cylinder of tracks in response to the arrangement of gaps on the format track associated with said given cylinder.

3. Apparatus for controlling the flow of data to and from a rotating disk file having a plurality of magnetizable disks, each of said disks having at least one magnetizable surface for magnetic recording in a plurality of concentric tracks, comprising a format transducer and a plurality of data transducers for cooperating with said magnetizable surfaces, said transducers being adapted to move as a unit to different positions to cooperate with different ones of said concentric tracks, those tracks associated with any given position of said transducers defining a cylinder of tracks, a format surface on one of said disks, said format surface having thereon a plurality of format tracks each said format track comprising one said concentric track, each said format track on said format surface comprising a pattern of a plurality of magnetic bits with gaps therebetween for establishing the number and length of records in all tracks within that cylinder of tracks including said last-recited format track, means for sensing said gaps on said format tracks by said format transducer associated with said format surface, and means for controlling the flow of data to and from the tracks in any given cylinder of tracks in response to the arrangement of said gaps on the format track associated with said given cylinder.

4. Apparatus for controlling the flow of data to and from a rotating disk file having a plurality of magnetizable disks, each of said disks having at least one magnetizable surface for magnetic recording in a plurality of concentric tracks, comprising a format transducer and a plurality of data transducers for cooperating with said magnetizable surfaces, said transducers being adapted to move as a unit to different positions to cooperate with different ones of said concentric tracks, those tracks associated with any given position of said transducers defining a cylinder of tracks, a format surface on one of said disks, said format surface having thereon a plurality of format tracks each said format track comprising one said concentric track, each said format track on said format surface comprising a pattern of a plurality of magnetic bits with gaps therebetween for establishing the number and the length of records in all tracks within that cylinder of tracks including said last-recited format track, means for sensing said gaps on said format tracks by said format transducer associated with said format surface, means for controlling the flow of data to and from the tracks in any given cylinder of tracks in response to the arrangement of said gaps on the format track associated with said given cylinder, and means for utilizing said magnetic bits on said format tracks for clocking said flow of data to said tracks.

5. Apparatus for controlling the flow of data to and from a rotating disk file having a plurality of magnetizable disks, each of said disks having at least one magnetizable surface for magnetic recording in a plurality of concentric tracks, comprising a format transducer and a plurality of data transducers for cooperating with said magnetizable surfaces, said transducers being movable as a unit to different positions to cooperate with different ones of said concentric tracks, those tracks associated with any given position of said transducers defining a cylinder of tracks, said surfaces including a format surface and a plurality of data surfaces, each of said tracks on said format surface being a format track comprising a pattern of a plurality of magnetic bits with gaps therebetween for establishing the number and length of records in all tracks within that cylinder of tracks including said last-recited format track, each of said format tracks defining at least one record having an address portion and a data portion, and means for recording on each of said data surfaces at least one data portion preceded by an address portion identifying said data portion, the locations of said address portion and said data portion on any of said data tracks in a given one of said cylinders of tracks corresponding to the locations of said address portion and said data portion on the one of said format tracks associated with that given cylinder of tracks.

6. Apparatus for controlling the flow of data to and from a rotating disk file having a plurality of magnetizable disks, each of said disks having at least one magnetizable surface for magnetic recording in a plurality of concentric tracks, comprising a format transducer and a plurality of data transducers for cooperating with said magnetizable surfaces.

said transducers being movable as a unit to different positions to cooperate with different ones of said concentric tracks, those tracks associated with any given position of said transducers defining a cylinder of tracks, said surfaces including a format surface and a plurality of data surfaces, each of said tracks on said format surface being a format track comprising a pattern of a plurality of magnetic bits with gaps therebetween for establishing the number and the length of records in all tracks within that cylinder of tracks including said last-recited format track, each of said format tracks defining at least one record having an address portion and a data portion, and means for recording on each of said data surfaces at least one data portion preceded by an address portion identifying said data portion, the locations and length of said address portion and said data portion on any one of said data tracks in a given one of said cylinders of tracks corresponding to the locations and lengths of the address portion and the data portion on the one of said format tracks associated with that given cylinder of tracks.

7. Apparatus for controlling the flow of data to and from a rotating disk file having a plurality of magnetizable disks, each of said disks having at least one magnetizable surface for magnetic recording in a plurality of concentric tracks, comprising a format transducer and a plurality of data transducers for cooperating with said magnetizable surfaces, said transducers being movable as a unit to different positions to cooperate with different ones of said concentric tracks, those tracks associated with any given position of said transducers defining a cylinder of tracks, said surfaces including a format surface and a plurality of data surfaces, each of said tracks on said format surface being a format track comprising a pattern of a plurality of magnetic bits with gaps therebetween for establishing the number and the length of records in all tracks within that cylinder of tracks including said last-recited format track, each of said format tracks defining at least one record having an address portion and a data portion, means for sensing said gaps on said format tracks by said format transducer associated with said format surface, and means for recording on each of said data surfaces under control of said sensed gaps on said format surface at least one data portion preceded by an address portion identifying said data portion, the locations of said address portion and said data portion on any said data tracks in a given one of said cylinders of tracks corresponding to the locations of said address portion and said data portion on the one of said format tracks associated with that given cylinder of tracks.

8. Apparatus for controlling the flow of data to and from a rotating disk file having a plurality of magnetizable disks, each of said disks having at least one magnetizable surface for magnetic recording in a plurality of concentric tracks, comprising a format transducer and a plurality of data transducers for cooperating with said magnetizable surfaces, said transducers being movable as a unit to different positions to cooperate with different ones of said concentric tracks, those tracks associated with any given position of said transducers defining a cylinder of tracks, said surfaces including a format surface and a plurality of data surfaces, each of said tracks on said format surface being a format track comprising a pattern of a plurality of magnetic bits with gaps therebetween for establishing the number and the length of records in all tracks within that cylinder of tracks including said last-recited format track, each of said format tracks defining at least one record having an address portion and a data portion, means for sensing said gaps on said format tracks by said format transducer associated with said format surface, means for recording on each of said data surfaces under control of said sensed gaps on said format surface at least one data portion preceded by an address portion identifying said data portion, the locations of said address portion and said data portion on any one of said data tracks in a given one of said cylinders of tracks corresponding to the locations of said address portion and said data portion on the one of said format tracks associated with that given cylinder of tracks, and means for preventing modification of said address portions of said data tracks.

9. Apparatus for controlling the flow of data to and from a rotating disk file having a plurality of magnetizable disks, each of said disks having at least one magnetizable surface for magnetic recording in a plurality of concentric tracks, comprising a format transducer and a plurality of data transducers for cooperating with said magnetizable surfaces, said transducers being movable as a unit to different positions to cooperate with different ones of said concentric tracks, those tracks associated with any given position of said transducers defining a cylinder of tracks, said surfaces including a format surface and a plurality of data surfaces, each of said tracks on said format surface being a format track comprising a pattern of a plurality of magnetic bits with gaps therebetween for establishing the number and length of records in all tracks within the cylinder of tracks including said last-recited format track, each of said format tracks defining at least one record having an address portion and a data portion, means for sensing said gaps on said format tracks by said format transducer associated with said format surface, and means for recording on and reproducing from each of said data surfaces under control of said sensed gaps on said format surface at least one data portion preceded by an address portion identifying said data portion, the locations of said address portion and said data portion on any one of said data tracks in a given one of said cylinders of tracks corresponding to the locations of said address portion and said data portion on the one of said format tracks associated with that given cylinder of tracks.

10. Apparatus for controlling the flow of data to and from a rotating disk file having a plurality of magnetizable disks, each of said disks having at least one magnetizable surface for magnetic recording in a plurality of concentric tracks, comprising a format transducer and a plurality of data transducers for cooperating with said magnetizable surfaces, said transducers being movable as a unit to different positions to cooperate with different ones of said concentric tracks, those tracks associated with any given position of said transducers defining a cylinder of tracks, said surfaces including a format surface and a plurality of data surfaces, each of said tracks on said format surface being a format track comprising a pattern of a plurality of magnetic bits with gaps therebetween for establishing the number and length of records in all tracks within that cylinder of tracks including said last-recited format track, each of said format tracks defining at least one record having an address portion and a data portion, means for sensing said gaps on said format tracks by said format transducer associated with said format surface, means for recording on and reproducing from each of said data surfaces under control of said sensed gaps on said format surface at least one data portion preceded by an address portion identifying said data portion, the locations of said address portion and said data portion on any one of said data tracks in a given one of said cylinders of tracks corresponding to the locations of said address portion and said data portion on the one of said format tracks associated with that given cylinder of tracks, and means responsive to said bits on said format surface for controlling the clocking of said recording on said data surfaces.

11. Apparatus for controlling the flow of data to and from a rotating disk file having a plurality of magnetizable disks, each of said disks having at least one magnetizable surface for magnetic recording in a plurality of concentric tracks, comprising a format transducer and a plurality of data transducers for cooperating with said magnetizable surfaces, said transducers being movable as a unit to different positions to cooperate with different ones of said concentric tracks, those tracks associated with any given position of said transducers defining a cylinder of tracks, said surfaces including a format surface and a plurality of data surfaces, each of said tracks on said format surface being a format track comprising a pattern of a plurality of magnetic bits with gaps therebetween for establishing the number and length of records in all tracks within that cylinder of tracks including said last-recited formal track, each of said format tracks defining at least one record having an address portion and a data portion, means for sensing said gaps on said format tracks by said format transducer associated with said format surface, means for recording on each of said data surfaces under control of said sensed gaps on said format surface at least one data portion preceded by an address portion identifying said data portion, the locations of said address portion and said data portion on any one of said data tracks in a given one of said cylinders of tracks corresponding to the locations of said address portion and said data portion on the one of said format tracks associated with that given cylinder of tracks, means responsive to said bits on said format surface for controlling the clocking of said recording on said data surfaces, and means for preventing modification of said address portions of said data tracks, 12. Apparatus for controlling the flow of data to and from a rotating disk file having a plurality of magnetizable disks, each of said disks having at least one magnetizable surface for magnetic recording in a plurality of concentric tracks, comprising a format transducer and a plurality of data transducers for cooperating with said magnetizable surfaces, said tranducers being movable as a unit to different positions to cooperate with different ones of said concentric tracks, those tracks associated with any given position of said transducers defining a cylinder of tracks, said surfaces including a format surface and a plurality of data surfaces, each of said tracks on said format surface being a format track comprising a pattern of a plurality of magnetic bits with gaps therebetween for establishing the number and length of records in all tracks within that cylinder of tracks including said last-recited format track, each of said format tracks defining at least one record having an address portion and a data portion, means for recording on each of said data surfaces at least one data portion preceded by an address portion identifying said data portion, the locations of said address portion and said data portion on any given one of said data tracks corresponding to the locations of said address portion and said data portion on the one of said format tracks associated with the cylinder of tracks within which said given data track is located, and means for preventing modification of said address portions of said data tracks.

References Cited by the Examiner

UNITED STATES PATENTS

| | | | |
|---|---|---|---|
| 2,969,525 | 1/61 | Hill | 340—174.1 |
| 3,079,594 | 2/63 | Johnson | 340—174.1 |
| 3,082,406 | 3/63 | Stevens | 340—174.1 |
| 3,085,230 | 4/63 | Shoultes et al. | 340—174.1 |

FOREIGN PATENTS

| | | |
|---|---|---|
| 213,527 | 2/58 | Australia. |

IRVING L. SRAGOW, *Primary Examiner.*